United States Patent
Mentz et al.

(10) Patent No.: US 9,473,799 B1
(45) Date of Patent: Oct. 18, 2016

(54) RESOURCE DATA QUERY PROCESSING

(71) Applicant: Amazon Technologies, Inc., Seattle, WA (US)

(72) Inventors: Joshua Mentz, Cape Town (ZA); Timothy Ralph Sjoberg, Cape Town (ZA); Ronen Dov Agranat, Cape Town (ZA); Willem Jacob Buys, Cape Town (ZA); Gregory Jonathan Kempe, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 248 days.

(21) Appl. No.: 14/109,355

(22) Filed: Dec. 17, 2013

(51) Int. Cl.
| | |
|---|---|
| G06F 15/173 | (2006.01) |
| H04N 21/262 | (2011.01) |
| H04L 29/08 | (2006.01) |
| H04L 9/32 | (2006.01) |
| G06F 17/30 | (2006.01) |

(52) U.S. Cl.
CPC .. *H04N 21/26241* (2013.01); *G06F 17/30896* (2013.01); *H04L 9/3213* (2013.01); *H04L 67/2842* (2013.01)

(58) Field of Classification Search
USPC .............. 709/216, 213, 203, 226; 726/7; 1/1
See application file for complete search history.

(56) References Cited

U.S. PATENT DOCUMENTS

| | | | | |
|---|---|---|---|---|
| 8,065,417 B1 * | 11/2011 | Richardson | ...... | H04N 21/26241 709/226 |
| 9,083,652 B2 * | 7/2015 | Lyon | ...................... | G06Q 30/02 |
| 2008/0077653 A1 * | 3/2008 | Morris | .............. | G06F 17/30896 709/203 |
| 2013/0019295 A1 * | 1/2013 | Park | ...................... | H04L 9/3213 726/7 |
| 2013/0041974 A1 * | 2/2013 | Luna | ........................ | A61B 3/10 709/213 |

OTHER PUBLICATIONS

U.S. Appl. No. 13/33,604, filed Jan. 3, 2013, Mentz et al.
"New iPhone app translates foreign-language signs" [online][retrieved on Nov. 26, 2012], retrieved from: http://articles.cnn.com/2010-12-20/tech/word.lens.iphone.app_1_iphone-app-android-foreign-language?_s=PM:TECH 2 pps.

* cited by examiner

*Primary Examiner* — Kyung H Shin
(74) *Attorney, Agent, or Firm* — Lee & Hayes, PLLC

(57) ABSTRACT

A distributed execution environment provides resources such as computing resources, hardware resources, and software resources. One or more resource data providers might also operate in conjunction with the distributed execution environment to provide resource data describing various aspects of the resources in the distributed execution environment. A query service may obtain resource data provided by the resource data providers in order to generate responses to queries. In order to obtain the resource data from the resource data providers, the query service may utilize various "pull" and "push" mechanisms. Using a push mechanism, the resource data providers push resource data to the query service. Utilizing a pull mechanism, the query service pulls the resource data from the resource data providers. The query service might also store resource data received from the resource data providers in a cache and utilize the cached resource data when responding to queries for resource data.

20 Claims, 9 Drawing Sheets

RESOURCE DATA QUERY PROCESSING

BACKGROUND

Network-based services exist that allow customers to purchase and utilize virtual machine instances on a permanent or as-needed basis. In addition to virtual machine instances, these services typically allow customers to purchase and utilize other types of computing resources. For example, customers might be permitted to purchase and utilize data storage resources, database resources, networking resources, and other types of computing resources (which may be referred to herein as "resources").

Managing network-based services such as those described above can be extremely complex. At least some of this complexity is attributable to the large number of computing resources that typically exist in such a service at any given time. For example, some network-based services might utilize dozens of geographically dispersed data centers, hundreds of thousands or even millions of server computers and virtual machine instances, along with large numbers of networking components, software programs, and other types of resources. When large numbers of resources such as these are utilized by a network service in this way, it can be very difficult for a customer or system administrator to obtain information regarding a particular resource, or resources. This may be caused, at least in part, by the fact that a large number of disparate systems and/or services might be utilized to collect and/or maintain information describing the operational status of resources, the configuration of the resources, the location of the resources, and/or other types of data about the resources in a distributed execution environment.

The disclosure made herein is presented with respect to these and other considerations.

DETAILED DESCRIPTION

Figure 1:
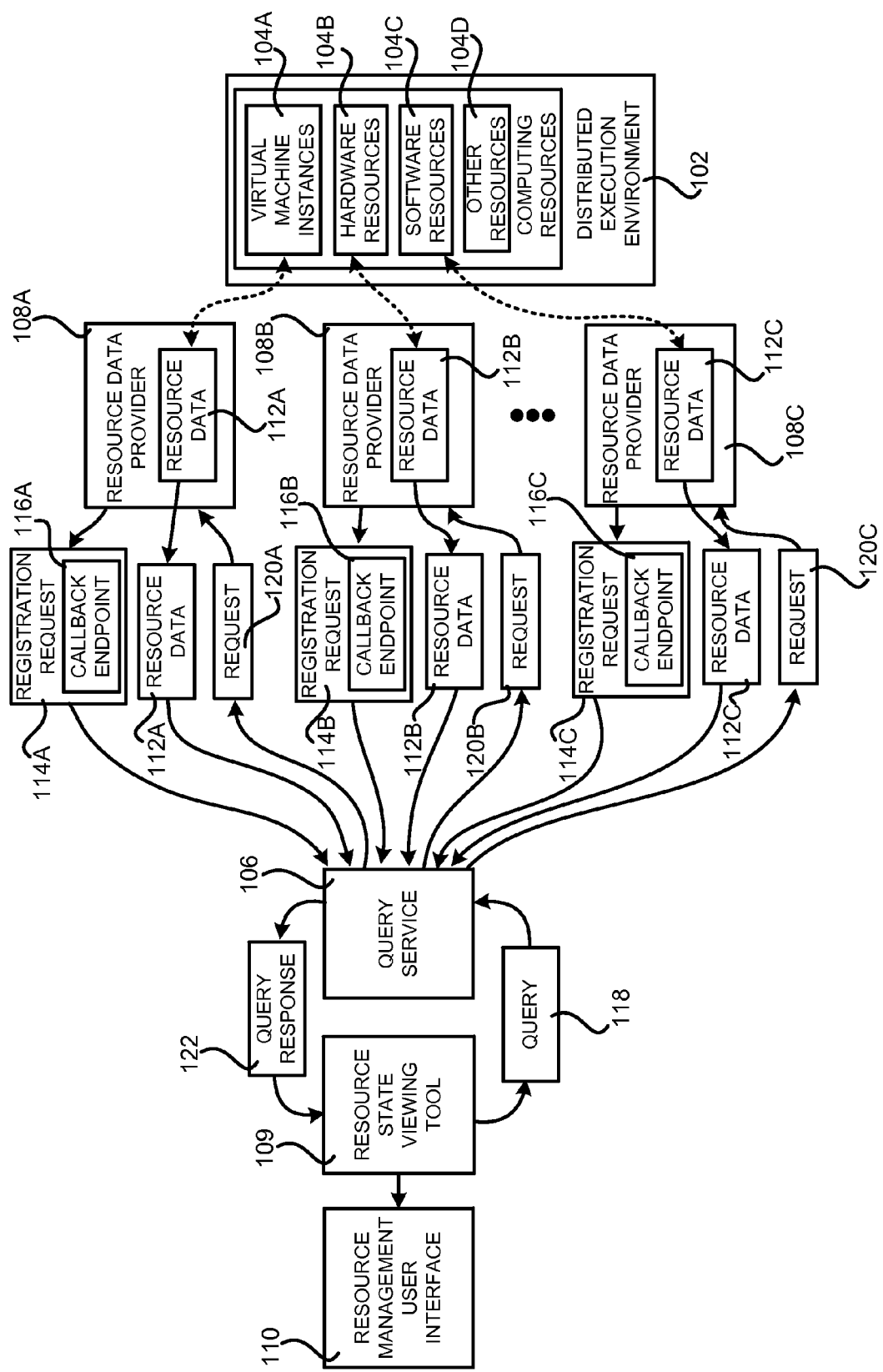
FIG. 1 is a computer system diagram providing details regarding one mechanism disclosed herein for processing queries for resource data describing resources in a distributed execution environment that utilizes a "pull" model for obtaining the resource data, according to one embodiment presented herein.

The following detailed description is directed to technologies for processing queries for data describing resources in a distributed execution environment. Utilizing the concepts and technologies described herein, data describing aspects of resources in a distributed execution environment, such as data describing the operational status, location, and/or configuration of resources in the distributed execution environment, can be obtained from multiple providers. The obtained data can then be utilized to generate and provide responses to queries for the data describing the resources in an efficient manner.

According to one aspect presented herein, a computer-implemented mechanism is disclosed for processing queries for data describing resources in a distributed execution environment. In one implementation, the mechanism disclosed herein operates in conjunction with a network-based distributed execution environment in which customers can purchase, configure, and utilize computing resources, such as virtual machine instances, data storage resources, networking resources, and database resources, on a permanent or as-needed basis.

The distributed execution environment may offer computing resources for purchase and use in various configurations. For example, and without limitation, the distributed execution environment might offer virtual machine instances available for purchase and use that have many different configurations of processor capabilities, main memory, disk storage, and operating system. A customer of the distributed execution environment might create, configure, and deploy various combinations of computing resources provided by a distributed execution environment to create "solutions" that provide various types of functionality, such as application hosting, backup and storage, content delivery, Web hosting, enterprise IT solutions, database services, and others.

The distributed execution environment might also include various types of computing resources such as those described above, hardware resources such as data centers, rooms of server computers in data centers, racks of server computers, individual server computers, software resources, resources describing customers and other users of the distributed execution environment, and other types of resources. As will be described in greater detail below, the technologies disclosed herein can be utilized to process queries for data describing aspects of these, and potentially other, types of computing resources in a distributed execution environment.

Various components might be configured to obtain and/or maintain data regarding the resources in the distributed execution environment. For example, and without limitation, a resource monitoring component executing within or in conjunction with the distributed execution environment might be configured to collect data regarding the operational state of computing resources in the distributed execution environment. The resource monitoring component might collect resource data that describes the operational state of data centers, racks of server computers, server computers, networking devices, software components, and/or instances of virtual machines and other types of resources in the distributed execution environment. The resource monitoring component might also make the collected resource data available for consumption and use by other components. Other types of components, systems and/or services might also maintain data (referred to herein as "resource data") that describes the configuration, location, operational state, and/or other aspects of resources utilized in the distributed computing environment. These components, systems and/or services might also make this data available for consumption and use by other components. Components that make resource data available to other components are referred to herein as "resource data providers."

In one implementation, a resource state viewing tool executes within or in conjunction with the distributed execution environment, and provides a resource management UI through which users can view the resource data collected by the resource monitoring component and/or other resource data providers. For example, an administrator or customer of the distributed execution environment might utilize a user computing system, like a desktop or laptop computer, a smartphone, or a tablet computing device to request and view the resource management UI for a particular resource. In order to provide this functionality, the resource management UI might be provided by way of a Web page, a client-server application, a mobile application, or in another manner. The resource management UI may allow a user to quickly view resource data for resources in the distributed execution environment at various levels of granularity.

In one implementation, the resource state viewing tool is configured to allow users to submit queries for selecting and viewing a subset of the resources in a distributed execution environment. These queries might be specified utilizing a graphical UI or as text-based queries. For example, and without limitation, a user might submit a query requesting to view resource data for all virtual machine instances in the distributed execution environment that have a problem condition. As another example, a user might submit a query requesting to view resource data for all printers located in a certain room utilized by the distributed execution environment. The queries might be specified using logical operators typically available when performing queries, such as "AND" and "OR." Other types of logical operators might also be specified in a query.

In order to facilitate the processing of queries for resource data such as those described above, a query service is provided in one embodiment disclosed herein. The resource state viewing tool can provide a user-supplied query to the query service and, in reply thereto, the query service can provide a query response that includes the resource data for a selected subset of resources in the distributed execution environment. In this regard, it should be appreciated that while the embodiments disclosed herein are primarily presented in the context of a query service that processes queries supplied by a resource state viewing tool, the query service disclosed herein may be configured to process queries supplied by other systems, services, or components. The query service might also be configured to receive queries for resource data directly from users.

The query service may utilize various mechanisms to obtain resource data for processing queries in various embodiments disclosed herein. In one particular embodiment, the query service utilizes a "pull" mechanism for obtaining resource data from resource data providers configured to provide the resource data. In this embodiment, various resource data providers may register with the query service as providers of certain types of resource data. For example, a resource data provider might register with the query service as a provider of resource data relating to printers in the distributed execution environment. In order to register with the query service, each resource data provider might supply a registration request to the query service identifying the type of resource data for which they are a provider. The registration request might also identify a callback endpoint that can be utilized to transmit queries to the resource data provider for resource data. Multiple resource data providers might register with the query service in this manner as providers of various types of resource data.

In order to process a query, such as a query submitted through the resource management UI, the query service identifies the resource data providers from which resource data is to be obtained in order to respond to the query. For example, and without limitation, if the query is for printers in a certain room of the distributed execution environment, the query service would identify the resource data provider registered to provide resource data about printers. Depending upon the nature of the query, multiple resource data providers might be identified in this way.

Once the resource data providers to be queried have been identified, the query service requests resource data from the identified providers for generating a response to the query. The callback endpoints provided during registration of the resource data providers may be utilized to transmit requests to the identified resource data providers for resource data. In response thereto, the resource data providers return resource data to the query service. The query service may then utilize the received resource data to generate a response to the original query. For example, and without limitation, the query service may perform one or more statistical, mathematical and/or logical operations (e.g. selection, union, and/or negation) on the received resource data in order to generate a query response. Other types of operations might also be performed in order to generate the query response. The response may then be provided in reply to the query for the resource data. For example, a query response may be provided to the resource state viewing tool in reply to a query.

In some implementations, the query service stores resource data received from resource data providers in a cache for use in generating responses to subsequent queries. For example, and without limitation, the query service might utilize the resource data stored in the cache when a network connection to one or more of the resource data providers is unavailable or degraded. As another example, the query service might also utilize the data stored in the cache to satisfy queries when a request has been transmitted to a resource data provider and a response to the request has not been received within a predefined amount of time. In some embodiments, a query specifies the amount of time that the query service is to wait for a response from resource data providers before utilizing resource data stored in the cache to satisfy a query. The amount of time to wait before utilizing cached data to process a query might also be specified in other ways in other embodiments.

In another embodiment, the query service utilizes a "push" model to obtain resource data from the various resource data providers. In this embodiment, resource data providers also register as providers of various types of resource data for resources in a distributed execution environment. In this embodiment, however, the resource data providers periodically push resource data to the query service. The query service then stores the received resource data in a cache. The query service may then utilize the resource data stored in the cache to generate responses to queries, such as queries received from the resource state viewing tool. The resource data providers may periodically provide additional resource data for storage in the cache. For example, and without limitation, the resource data providers may supply resource data that has changed or been updated since a previous time the resource data was provided to the query service. Alternately, a resource data provider might supply a full set of resource data to the query service for storage in the cache.

In some embodiments the cache is an in-memory cache that the query service stores in main memory, such as in a random access memory ("RAM"). When an in-memory cache is utilized, the query service may utilize various optimizations to minimize the amount of memory utilized to store the resource data. For example, and without limitation, the query service may store unique values of resource data one time and then store pointers to the unique values in the cache. In this way, the storage of unique values of resource data can be de-duplicated. Other types of memory optimizations might also be utilized.

In some implementations, the query service might also utilize a "pull" mechanism in conjunction with the push mechanism described above. In this embodiment, resource data providers may push resource data to the query service in the manner described above. If, however, the query service determines that resource data stored in the cache for a particular resource provider is older than a predefined period of time, the query service may transmit a request to the resource data provider for updated resource data. The resource data provider may then respond with updated resource data. The query service stores the updated resource data in the cache for use in processing future queries. Other mechanisms might also be utilized to maintain up-to-date resource data in the cache.

In yet another embodiment, the query service utilizes a "pull" model to obtain resource data from resource data providers in conjunction with a cache for storing the resource data. In this embodiment, resource data providers are registered as providers of certain types of resource data in the manner described above. In this embodiment, however, each resource data provider may also specify a polling interval in addition to a callback endpoint. The polling interval defines a time interval at which a resource data provider is to be polled for new resource data. The polling interval for use with each resource data provider might also be specified in other ways in other embodiments.

The query service periodically polls the resource data providers at the specified callback endpoints for new resource data. In response thereto, the resource data providers provide changed resource data, which the query service stores in a cache. The query service may utilize one or more memory optimizations such as those described above in order to minimize the size of an in-memory or other type of cache. When a query is received, the query service utilizes the contents of the cache to generate and provide a query response.

In some implementations, the query service provides a timestamp to resource data providers when polling for new resource data. The timestamp indicates a time at which a last request for resource data was made to the resource data provider. The resource data providers may utilize the specified timestamp to identify and provide only resource data that has changed since a last request was received for resource data from the query service.

It should be appreciated that various combinations of the push and pull mechanisms described above might be utilized in various embodiments. For example, and without limitation, a push model for obtaining resource data might be utilized with one or more resource data providers while a pull model is utilized with other resource data providers. In another example, a push or a pull model might be dynamically selected and utilized for a single resource data provider depending upon various factors. The query service and the resource data providers might also engage in a negotiation by which a push or pull model is selected. Alternately, the query service might instruct a resource data provider which model to utilize. A resource data provider might similarly instruct the query service as to which model it will utilize. Various mechanisms might also be utilized by the query service to determine which resource data provider to utilize when two or more resource data providers have registered as providers of the same type of resource data. Additional details regarding the various components and processes described above for processing queries for data describing resources in a distributed execution environment will be presented below with regard to FIGS. 1-9.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed execution environments, where tasks are performed by remote processing devices that are linked through a communications network. In a distributed execution environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a computer system diagram providing details regarding one mechanism disclosed herein for processing queries for resource data 112 describing resources 104 in a distributed execution environment 102 that utilizes a "pull" model for obtaining the resource data 112, according to one embodiment presented herein. As discussed briefly above, the various mechanisms disclosed herein operate in conjunction with a network-based distributed execution environment 102 in which customers can purchase and utilize various types of computing resources, such as virtual machine instances 104A, on a permanent or as-needed basis. The distributed execution environment 102 may offer virtual machine instances 104A for purchase in various configurations. For example, the distributed execution environment 102 might offer virtual machine instances 104A available for purchase and use that have many different configurations of processor capabilities, main memory, disk storage, and operating system.

In addition to the virtual machine instances 104A, the distributed execution environment 102 might also utilize and/or provide many other types of computing resources. For example, and without limitation, the distributed execution environment 102 might also include hardware resources 104B such as data centers that include rooms with racks of server computers, software resources 104C, and other resources 104D, such as networking resources, power resources, resources describing customers and other users of the distributed execution environment 102, and other types of resources. The computing resources provided by the distributed execution environment may be referred to herein as "resources" or "computing resources." The distributed execution environment 102 might also include other types of computing resources not shown in FIG. 1 or identified explicitly above. As will be described in greater detail below, the technologies disclosed herein can be utilized to process queries for resource data 112 describing these, and potentially other, types of computing resources in the distributed execution environment 102.

As mentioned briefly above, the owner and/or operator of the distributed execution environment 102 may charge a fee for operating the virtual machine instances 104A to the customer that creates the virtual machine instances 104A. Various different pricing models might be utilized to charge a customer for use of the virtual machine instances 104A within the distributed execution environment 102. The operator of the distributed execution environment 102 might also charge a fee for the creation and/or use of other types of computing resources provided by the distributed execution environment 102. Additional details regarding the implementation, configuration and operation of the distributed execution environment 102 will be provided below with regard to FIGS. 7-9.

As also mentioned briefly above, various components might be configured to obtain and/or maintain data regarding the computing resources in the distributed execution environment 102. For example, and without limitation, a resource monitoring component (not shown in FIG. 1) executing within or in conjunction with the distributed execution environment 102 might be configured to collect data regarding the operational state of computing resources in the distributed execution environment. The resource monitoring component might collect data that describes the operational state of data centers, racks of server computers, server computers, networking devices, software components, and/or instances of virtual machines 104A and other types of computing resources in the distributed execution environment 102. The resource monitoring component might also make the collected data available for consumption and use by other components. Other types of components, systems and/or services might also maintain data (referred to herein as "resource data 112") that describes the configuration, location, operational state, and/or other aspects of computing resources utilized in the distributed computing environment 102. These components, systems and/or services might also make the resource data 112 available for consumption and use by other components. Components that make resource data available to other components are referred to herein as "resource data providers 108."

The illustrative environment shown in FIG. 1 includes three resource data providers 108A-108C. In the example shown in FIG. 1, the resource data provider 108A is configured to provide resource data 112A about virtual machine instances 104A in the distributed execution environment. The resource data provider 108B is configured to provide resource data 112B about hardware resources 104B in the distributed execution environment. The resource data provider 108C is configured to provide resource data 112C about software resources 104C in the distributed execution environment. It should be appreciated that many more resource data providers 108 may be utilized than shown in FIG. 1 to provide resource data 108 about many other, different types of computing resources in the distributed execution environment 102.

It should also be appreciated that while the resource data providers 108 are shown in FIG. 1 and the other FIGS. as being located outside the distributed execution environment 102, the resource data providers 108 might also be operated within the disturbed execution environment 102. In this regard, it should also be appreciated that the resource data providers 108 might operate in conjunction with, or as a part of, services implemented within the distributed execution environment. For example, and without limitation, computing resources within the distributed execution environment 102 may be utilized to implement various types of services (e.g. Web services) for providing various functions, such as tracking where virtual machine instances 104A are executing, tracking the health status of software resources 104C and/or hardware resources 104B, deploying software to hardware resources 104B, monitoring network traffic, mapping private IP addresses to public IP addresses, attaching volumes to host computers, backing up volumes, performing tests, configuring hosts, and for performing many other types of functions.

The resource data providers 108 may be operated in conjunction with, or as a part of, services operating within the distributed execution environment 102, such as those described above. In this regard, the resource data providers 108 might be configured to provide resource data 112 regarding the operation of a service executing in the distributed execution environment 102, the software utilized to implement the service, the hardware resources 104B utilized to execute the service, any data utilized by the service, and any other information regarding the operational status of the service. Through the use of the resource data providers 108 and the mechanism described herein, a system administrator can obtain and utilize this resource data 112 for many disparate services, and other components, within the distributed execution environment 102.

In some embodiments, a resource state viewing tool 109 executes within or in conjunction with the distributed execution environment 102. The resource state viewing tool 109 provides a UI through which users can query and view resource data 112 provided by the various resource data providers 108. For example, in one implementation the resource state viewing tool 109 is configured to provide a resource management UI 110. The resource management UI 110 provides a UI for viewing and interacting with resource data 112 collected regarding the computing resources in the distributed execution environment 102. In one implementation, a user of a user computing device, such as a smartphone, a desktop or laptop computer, or a tablet computing device, might utilize an appropriate client application (not shown in FIG. 1) to request, view, and interact with the resource management UI 110. In order to provide this functionality, the resource management UI 110 might be provided by way of a Web page, a client-server application, a mobile application, or in another manner.

The resource management UI 110 may be configured in order to allow a user to quickly view information about computing resources in the distributed execution environment 102 at various levels of granularity. For example, in one particular implementation, the resource management UI 110 allows a user to view information about resources in the distributed execution environment 102, such as information about the operational state of the resources, at levels of granularity varying from a worldwide level down to a level showing a particular virtual machine instance or other software component executing on a particular server computer. The user can utilize functionality provided by the resource management UI 110 to quickly and easily navigate between levels and view aggregated information about resources in the distributed execution environment 102 at each level. One particular resource management UI 110 is described in U.S. patent application Ser. No. 13/733,604, entitled "Managing Resources in a Distributed Execution Environment", which was filed on Jan. 3, 2013, and which is expressly incorporated by reference herein in its entirety. The embodiments disclosed herein might also be utilized with other types of user interfaces.

In one implementation, the resource state viewing tool 109 is configured to allow users to submit queries 118 for selecting and viewing a subset of the resources in the distributed execution environment 102. As mentioned above, queries 118 might be specified utilizing a graphical UI or as text-based queries. For example, and without limitation, a user might submit a query 118 requesting to view resource data 112 for all virtual machine instances 104A in the distributed execution environment 102 that have a problem condition or that satisfy other criteria. As another example, a user might submit a query requesting to view all printers located in a certain room utilized by the distributed execution environment 102. The queries might be specified using logical operators typically available when performing queries, such as "AND" and "OR." Other types of logical operators might also be specified in a query.

In order to facilitate the processing of queries 118 for resource data 112 such as those described above, a query service 106 is provided in one embodiment disclosed herein. The resource state viewing tool 109 can provide a user-supplied query 118 to the query service 106 and, in reply thereto, the query service 106 can provide a query response 122 that includes the resource data 112 for a selected subset of computing resources in the distributed execution environment 102. In this regard, it should be appreciated that while the embodiments disclosed herein are primarily presented in the context of a query service 106 that processes queries 118 supplied by a resource state viewing tool 109, the query service 106 disclosed herein may be configured to process queries supplied by other systems, services, and/or components. The query service 106 might also be configured to provide an interface for receiving queries 118 for resource data 112 directly from users.

As mentioned briefly above, the query service 106 may utilize various mechanisms to obtain resource data 112 needed to process received queries 118 in various embodiments disclosed herein. In the embodiment shown in FIG. 1, the query service 106 utilizes a "pull" mechanism for obtaining resource data 112 from resource data providers 108 configured to provide the resource data 112. In this embodiment, the resource data providers 108 may register with the query service 106 as providers of certain types of resource data 112. For example, the resource data provider 108A might register with the query service 106 as a provider of resource data 112A relating to virtual machine instances 104A executing in the distributed execution environment 102. Similarly, the resource data provider 108B might register with the query service 106 as a provider of resource data 112B relating to hardware resources 104B like printers in the distributed execution environment 102. The resource data provider 108C might register with the query service 106 as a provider of resource data 112C relating to software resources 104C in the distributed execution environment 102. Other resource data providers 108 might register as providers as other types of resource data 112.

In order to register with the query service 106, each resource data provider 108 supplies a registration request 114 to the query service 106 identifying the type of resource data 112 for which they are a provider in one embodiment. For example, the resource data provider 108A submits a registration request 114A, the resource data provider 108B submits a registration request 114B, and the resource data provider 108C submits a registration request 114C. Each registration request 114 might also identify a callback endpoint 116 that can be utilized to transmit queries to the resource data provider 108 for resource data 112. The callback endpoint 116 might be an Internet protocol ("IP") address for the resource data provider 108 at which requests for resource data 112 are received. As shown in FIG. 1, each resource data provider 108 may supply a unique callback endpoint (i.e. the resource data providers 108A-108C have supplied the callback endpoints 116A-116C with the registration requests 114A-114C, respectively). Multiple resource data providers 108 might register with the query service 106 in this manner as providers of various types of resource data 112.

In order to process a query 118, such as a query 118 submitted through the resource management UI 110 and provided by the resource state viewing tool 109, the query service 106 identifies the resource data providers 108 from which resource data 112 is to be obtained in order to process to the received query 118. For example, and without limitation, if the query 118 is for printers in a certain room of the distributed execution environment 102, the query service would identify the resource data provider registered to provide resource data about printers (i.e. the resource data provider 108B in the example shown in FIG. 1). Depending upon the nature of the query, multiple resource data providers 108 might be identified by the query service 106.

Once the query service 106 has identified the resource data providers 108 from which resource data 112 is to be requested, the query service 106 requests resource data 112 from the identified providers 108 for generating a response to the query 118. The callback endpoints 116 provided during registration of the resource data providers 108 may be utilized to transmit requests 120 to the identified resource data providers 108 for resource data 112 (in the example shown in FIG. 1, requests 120A-120C have been transmitted to the resource data providers 108A-108C).

In response to receiving the requests 120A-120C, the queried resource data providers 108 return the requested resource data 112 to the query service 106. The query service 106 may then utilize the resource data 112 received from the resource data providers 108 to generate a response 122 to the original query 118. For example, and without limitation, the query service 106 may perform one or more statistical, mathematical, and/or logical operations (e.g. selection, union, difference, intersection, and/or negation) on the received resource data 112 to generate a query response 122. The query service 106 might also perform other types of operations on the received resource data 112 in order to generate a query response 122. The query response 122 may then be provided in reply to the query 118 for the resource data 112. For example, a query response 122 may be provided to the resource state viewing tool 109 in reply to a query 118. The query response 122 may then be utilized to generate the resource management UI 110 for presentation to a user.

In some implementations, the query service 106 stores resource data 112 received from resource data providers 108 in a cache (not shown in FIG. 1). Various types of caches may be utilized, such as an in-memory cache, a local or distributed database, a local or distributed key/value data store, or another type of cache. The query service 106 may then utilize the cached resource data 122 when generating query responses 122 for subsequent queries 118. For example, and without limitation, the query service 106 might utilize cached resource data 112 when a network connection to one or more of the resource data providers 108 is unavailable or is degraded. As another example, the query service 106 might also utilize cached resource data 112 to satisfy queries 118 when a request 120 has been transmitted to a resource data provider 108 and a response to the request 120 has not been received within a predefined amount of time. In some embodiments, the query 118 specifies the amount of time that the query service 106 is to wait for a response from resource data providers 108 before utilizing cached resource data 112 to satisfy a query 118. The amount of time to wait before utilizing cached resource data 112 to process a query 118 might also be specified in other ways in other embodiments. Additional details regarding the mechanism shown in FIG. 1 for obtaining resource data 112 for use in processing queries 118 utilizing a "pull" mechanism will be provided below with regard to FIG. 2.

Figure 2:
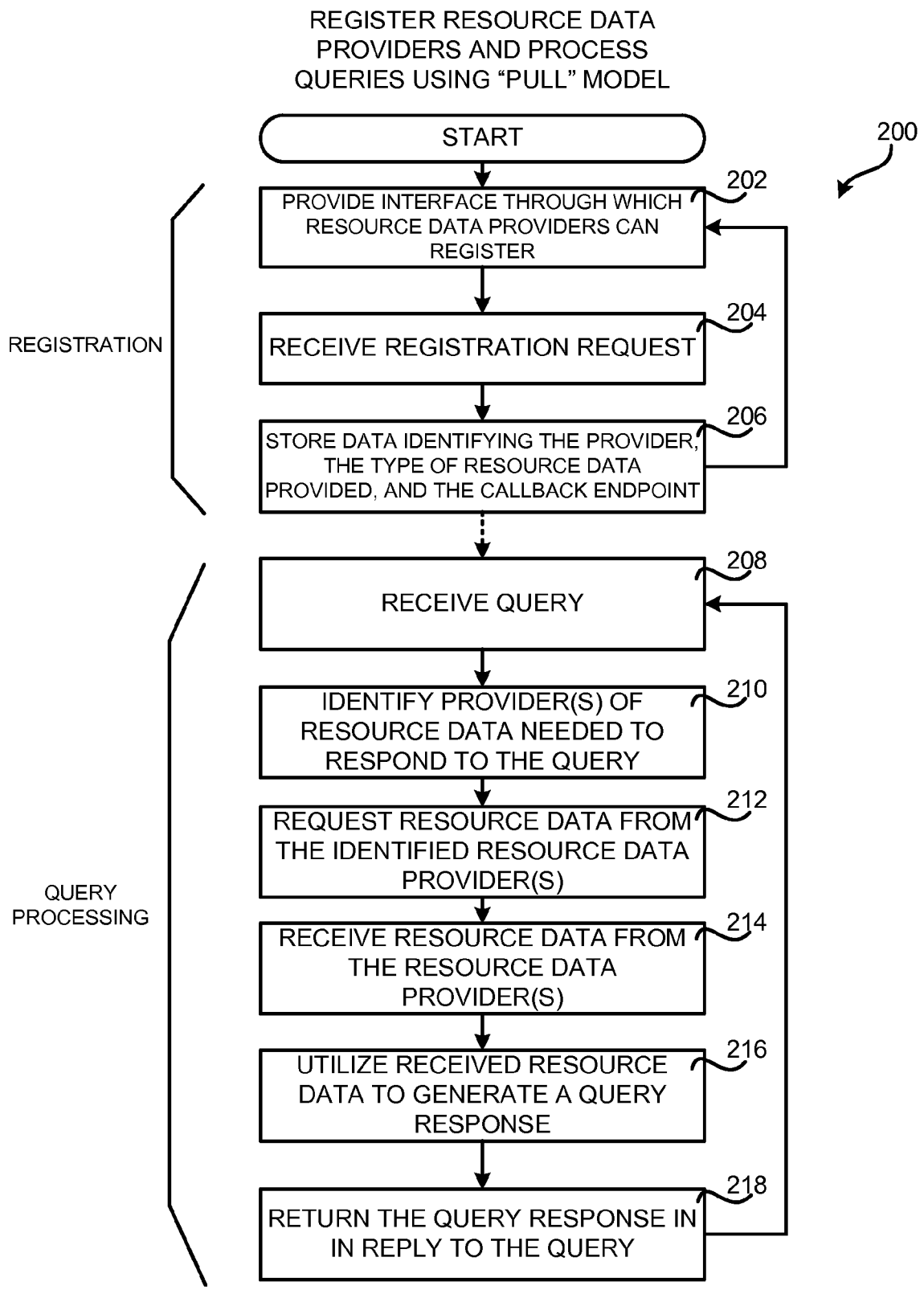
FIG. 2 is a flow diagram showing one illustrative routine for processing queries for resource data describing resources in a distributed execution environment that utilizes a "pull" model for obtaining the resource data, according to one embodiment disclosed herein.

FIG. 2 is a flow diagram showing one illustrative routine 200 for processing queries 118 for resource data describing resources in a distributed execution environment 102 that utilizes the "pull" model shown in FIG. 1 for obtaining resource data 112. It should be appreciated that the logical operations described herein with respect to FIG. 2 and the other figures are implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 200 begins at operation 202, where the query service 106 provides one or more interfaces through which the resource data providers 108 can register as providers of certain types of resource data 112. The interface, or interfaces, provided by the query service 106 may be a Web service application programming interface ("API") or another type of interface. Other mechanisms might also be implemented for allowing the resource data providers 108 to register as providers of resource data 112.

From operation 202, the routine 200 proceeds to operation 204, where the query service 106 receives a registration request 114 from a resource data provider 108. As mentioned above, the registration request 114 might identify the resource data provider 108 submitting the registration request and the type of resource data 112 provided by the resource data provider 108. As discussed above, the registration request 114 might also specify a callback endpoint 116 in some implementations. The callback endpoint 116 provides information for use by the query service 106 in requesting resource data 112 from the resource data provider 108. Other types of information might also be specified in a registration request 114.

From operation 204, the routine 200 proceeds to operation 206, where the query service 106 stores the data received in the registration request 114. For example, the query service 106 might store data identifying the resource data provider 108, the type of resource data 112 provided by the resource data provider 108, the specified callback endpoint 116 and potentially other information in an appropriate data store. As will be described in detail below, this information may be utilized to query resource data providers 108 in response to receiving a query 118 for resource data 112. From operation 206, the routine 200 may proceed back to operation 202, where additional resource data providers 108 may be registered with the query service 106 in the manner described above.

Once at least one resource data provider 108 has registered with the query service 106, the routine 200 may proceed from operation 206 to operation 208. At operation 208, the query service 106 receives a query 118 for resource data 112, such as from the resource state viewing tool 109. As mentioned briefly above, other systems and/or components may submit queries 118 to the query service 106. The routine 200 proceeds from operation 208 to operation 210 in response to receiving a query 118.

At operation 210, the query service 106 utilizes the submitted query 118 and the registration data stored at operation 206 to identify the resource data provider 108, or providers 108, from which resource data 112 is to be requested in order to process the received query 118. Once the resource data provider 108, or providers 108, to be queried have been identified, the routine 200 proceeds from operation 210 to operation 212, where the query service 106 transmits requests 120 to the resource data providers 108 identified at operation 210 for resource data 112 to process the query 118. The routine 200 then proceeds from operation 212 to operation 214.

At operation 214, the query service 106 receives resource data 112 from the queried resource data providers 108 in response to the transmitted requests 120. As mentioned above, in some embodiments, the query service 106 may store the received resource data 112 in a cache for use in responding to queries 118 when a connection to a resource data provider cannot be made or is degraded or when a resource data provider 108 is taking too long to reply to a request 120. Cached resource data 112 might also be utilized to respond to queries 118 under other circumstances in other embodiments.

From operation 214, the routine 200 proceeds to operation 216, where the query service 106 utilizes the resource data 112 received from the resource data providers 108 to generate a query response 122. As described above, the query service 106 may perform one or more statistical, mathematical, and/or logical operations (e.g. selection, union, and/or negation) on the resource data 112 received from the various resource data providers 108 in order to generate a query response 122. Other types of logical, arithmetic, statistical, and other types of operations might also be performed in order to generate the query response 122.

Once the query response 122 has been generated, the routine 200 proceeds from operation 216 to operation 218, where the query service 106 provides the generated query response 122 in reply to the query 118 for the resource data 112. For example, a query response 122 may be provided to the resource state viewing tool 109 in reply to a query 118. The routine 200 may then proceed back to operation 208, described above, where the query service 106 may process additional queries 118 in a similar manner.

Figure 3:
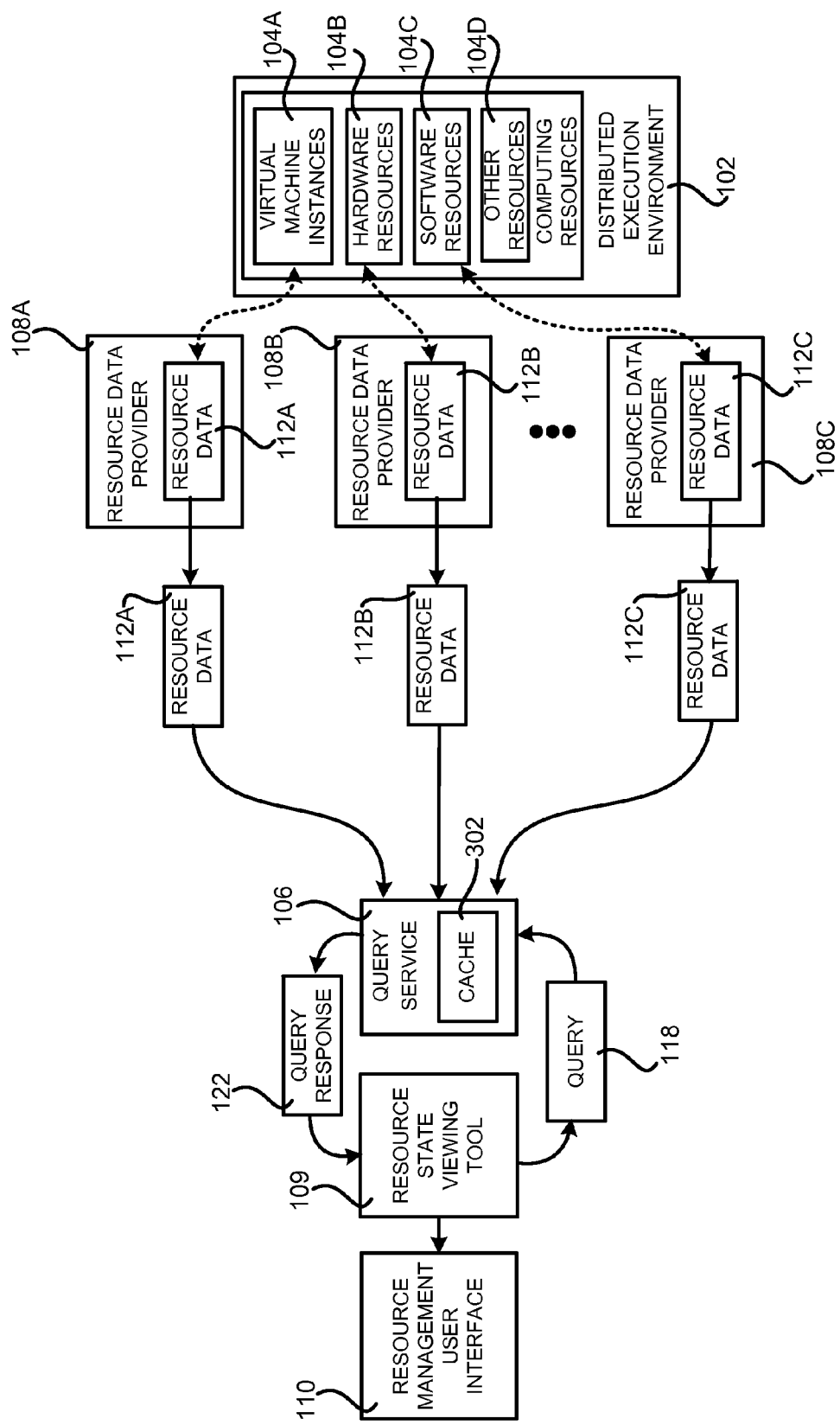
FIG. 3 is a computer system diagram providing details regarding one mechanism disclosed herein for processing queries for resource data describing resources in a distributed execution environment that utilizes a "push" model for obtaining the resource data, according to one embodiment presented herein.

FIG. 3 is a computer system diagram providing details regarding one mechanism disclosed herein for processing queries 118 for resource data 112 describing resources in a distributed execution environment 102 that utilizes a "push" model for obtaining the resource data 112, according to one embodiment presented herein. In the embodiment illustrated in FIG. 3, the query service 106 utilizes a "push" model to obtain resource data 112 from the registered resource data providers 108. In this embodiment, the resource data providers 108 also register as providers of various types of resource data 112 for resources in the distributed execution environment 102. In this embodiment, however, the resource data providers 108 periodically push their resource data 112 to the query service 106.

In the embodiment shown in FIG. 3, the query service 106 stores the resource data 112 received from the resource data providers 108 in a cache 302. As described briefly above, the cache 302 may be an in-memory cache, a local or distributed database, a local or distributed key/value data store, or another type of cache. The query service 106 may then utilize the resource data 112 stored in the cache 302 to generate responses to queries 118, such as queries 118 received from the resource state viewing tool 109.

According to various embodiments, the resource data providers 108 may periodically push additional resource data 112 to the query service 106 for storage in the cache 302 and use in processing queries 118. For example, and without limitation, the resource data providers 108 may supply resource data 112 that has changed or been updated since a previous time the resource data 112 was provided to the query service 106. Alternately, a resource data provider 108 might supply a full set of resource data 112 to the query service 106 for storage in the cache 302 on each push.

As mentioned briefly above, the cache 302 may be implemented as an in-memory cache that the query service 106 stores in main memory, such as in RAM. When an in-memory cache 302 is utilized, the query service 106 may implement various types of memory optimizations to minimize the amount of memory utilized to store the resource data 112. For example, and without limitation, the query service 106 may store unique values of resource data 112 one time and then store pointers to the unique values in the cache 302. In this way, the storage of unique values of resource data 112 can be de-duplicated. The query service 106 might also utilize other types of memory optimizations to store the resource data 112 in the cache 302. The memory optimizations described above may be utilized in conjunction with any of the mechanisms disclosed herein that utilize a cache 302.

In some implementations, the query service 106 utilizes aspects of the "pull" mechanism described above with regard to FIG. 1 in conjunction with aspects of the push mechanism for obtaining resource data 112 described above with regard to FIG. 2. In this embodiment, the resource data providers 108 may push resource data 112 to the query service 106 in the manner described above with regard to FIG. 2. If, however, the query service 106 determines that resource data 112 stored in the cache 302 for a particular resource data provider 108 is older than a predefined period of time, the query service 106 may transmit a request 120 to the resource data provider 108 for updated resource data 112. The resource data provider 108 may then respond with updated resource data 112. The query service 106 stores the updated resource data 112 in the cache 302 for use in processing future queries. The query service 106 might also utilize other mechanisms in order to maintain up-to-date resource data 112 in the cache 302. Additional details regarding the embodiment shown in FIG. 3 will be provided below with regard to FIG. 4.

Figure 4:
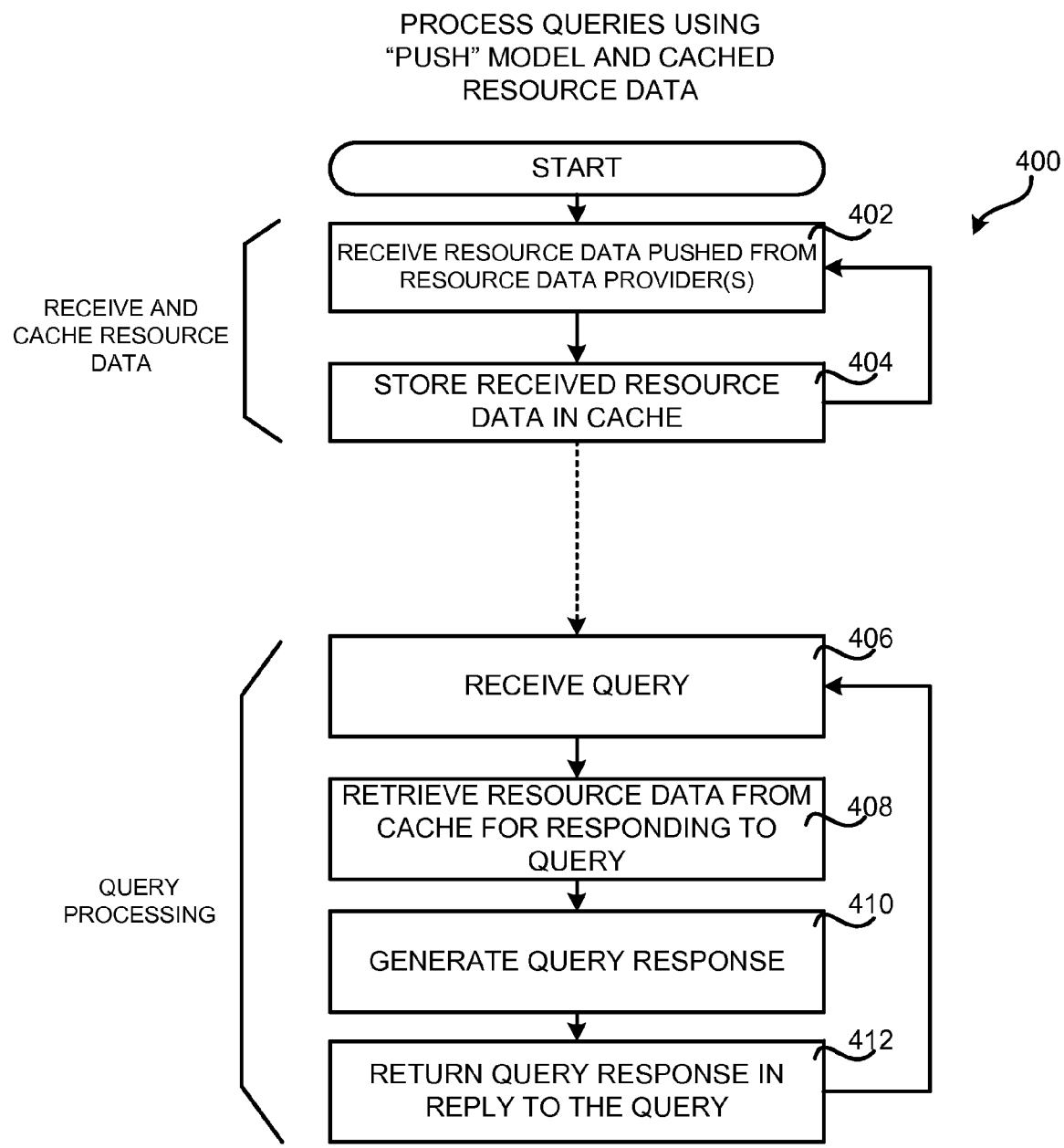
FIG. 4 is a flow diagram showing one illustrative routine for processing queries for resource data describing resources in a distributed execution environment that utilizes a "push" model for obtaining the resource data according to one embodiment disclosed herein.

FIG. 4 is a flow diagram showing one illustrative routine 400 for processing queries 118 for resource data 112 describing resources in a distributed execution environment 102 that utilizes the "push" model shown in FIG. 2 for obtaining the resource data 112 according to one embodiment disclosed herein. The routine 400 begins at operation 402, where the query service 106 receives resource data 112 pushed from the registered resource data providers 108. The routine 300 then proceeds from operation 402 to operation 404, where the query service 106 stores the received resource data 112 in the cache 302. As discussed above, the query service 106 might utilize various optimizations to minimize the size of the cache 302. From operation 404, the routine 400 may proceed back to operation 402, where additional resource data 112 pushed from the resource data providers 108 may be received and stored in the cache 302 in the manner described above.

From operation 404, the routine 400 proceeds to operation 406, where the query service 106 receives a query 118, such as from the resource state viewing tool 109 for example. In response to the receipt of a query 118, the routine 400 proceeds from operation 406 to operation 408, where the query service 106 retrieves resource data 112 from the cache 302 for responding to the query 118. As discussed briefly above, the query service 106 may transmit a request 120 for updated resource data 112 to one or more of the resource data providers 108 if the resource data 112 stored in the cache 302 is older than a predefined amount of time. Other conditions might also cause the query service 106 to transmit a request 120 for updated resource data 112 to a resource data provider 108. Updated resource data 112 might also be stored in the cache 302 for use in responding to subsequent queries 118.

From operation 408, the routine 400 proceeds to operation 410, where the query service 106 utilizes the resource data 112 retrieved from the cache 302 to generate a query response 122. As described above, the query service 106 may perform one or more logical, arithmetic, statistical, and/or other types of operations on the resource data 112 retrieved from the cache 302 in order to generate a query response 122.

Once the query response 122 has been generated, the routine 400 proceeds from operation 410 to operation 412, where the query service 106 provides the generated query response 122 in reply to the query 118 for the resource data 112. For example, a query response 122 may be provided to the resource state viewing tool 109 in reply to a query 118. The routine 400 may then proceed back to operation 406, described above, where the query service 106 may process additional queries 118 in a similar manner.

Figure 5:
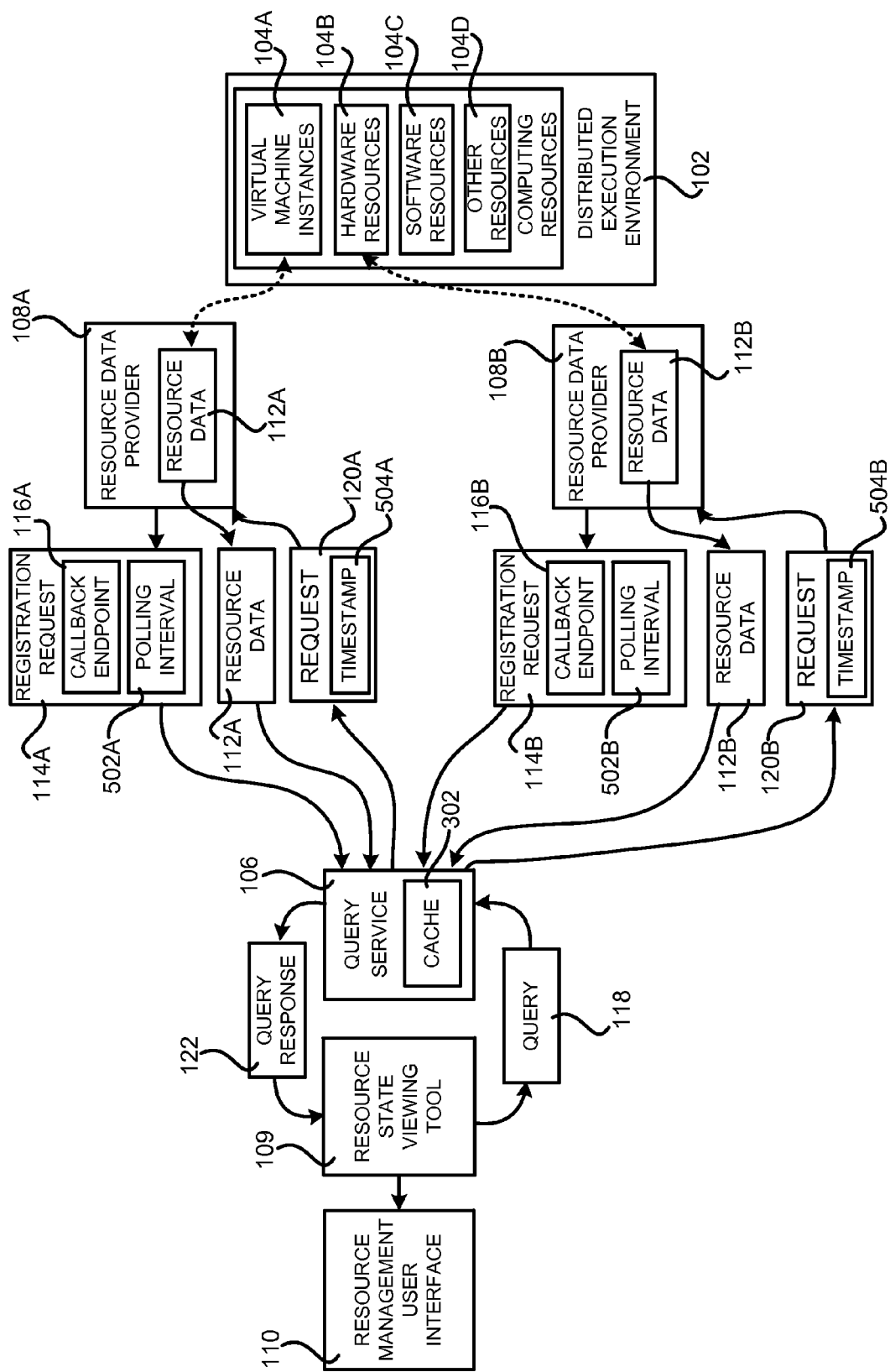
FIG. 5 is a computer system diagram providing details regarding one mechanism disclosed herein for processing queries for resource data describing resources in a distributed execution environment that utilizes a "pull" model for obtaining the resource data and a cache for storing the resource data, according to one embodiment presented herein.

FIG. 5 is a computer system diagram providing details regarding one mechanism disclosed herein for processing queries 118 for resource data 112 describing resources in a distributed execution environment 102 that utilizes a "pull" model for obtaining the resource data 112 in conjunction with a cache 302 for storing the resource data 112, according to one embodiment presented herein. In the embodiment illustrated in FIG. 5, the resource data providers 108 register as providers of certain types of resource data 112 in the manner described above with regard to FIG. 1.

In the embodiment shown in FIG. 5, each resource data provider 108 might also specify a polling interval 502 in addition to a callback endpoint 116 when registering with the query service 106. In the example shown in FIG. 5, for instance, the resource data provider 108A has specified a polling interval 502A and the resource data provider 108B has specified a polling interval 502B. The polling interval 502 defines a time interval at which the respective resource data provider 108 is to be polled for new resource data 112. For example, a polling interval 502 might be specified indicating that a particular resource data provider 108 is to be polled every five seconds or other time period. In the embodiment shown in FIG. 5, the polling interval 502 is specified in the registration request 114. It should be appreciated, however, that the polling interval 502 for use with each resource data provider 108 might also be specified in other ways in other embodiments.

In the embodiment shown in FIG. 5, the query service 106 polls the resource data providers 108 at the specified callback endpoints 116 for new resource data 112 at the frequency specified by the polling interval 502. In response thereto, the resource data providers 108 provide changed resource data 112, which the query service 106 stores in the cache 302. The query service 106 may utilize one or more memory optimizations such as those described above in order to minimize the size of an in-memory or other type of cache 302. When a query 118 is received, the query service 106 utilizes the resource data 112 stored in the cache 302 to generate and provide a query response 122 in the manner described above.

In some implementations, the query service 106 provides a timestamp 504 to the resource data providers 108 when polling for new resource data 112. For instance, in the example shown in FIG. 5, the request 120A includes a timestamp 504A and the request 120B includes a timestamp 504B. Each timestamp 504 indicates a time at which a last request 120 for resource data 112 was made to the respective resource data provider 108. The resource data providers 108 may utilize the specified timestamp 504 to identify and provide only resource data 112 that has changed since a last request was received for resource data 112 from the query service 106. The resource data providers 108 might utilize other mechanisms in other embodiments to identify and provide to the query service 106 only resource data 112 that has changed since a previous request 120. Additional details regarding the embodiment shown in FIG. 5 will be provided below with regard to FIG. 6.

Figure 6:
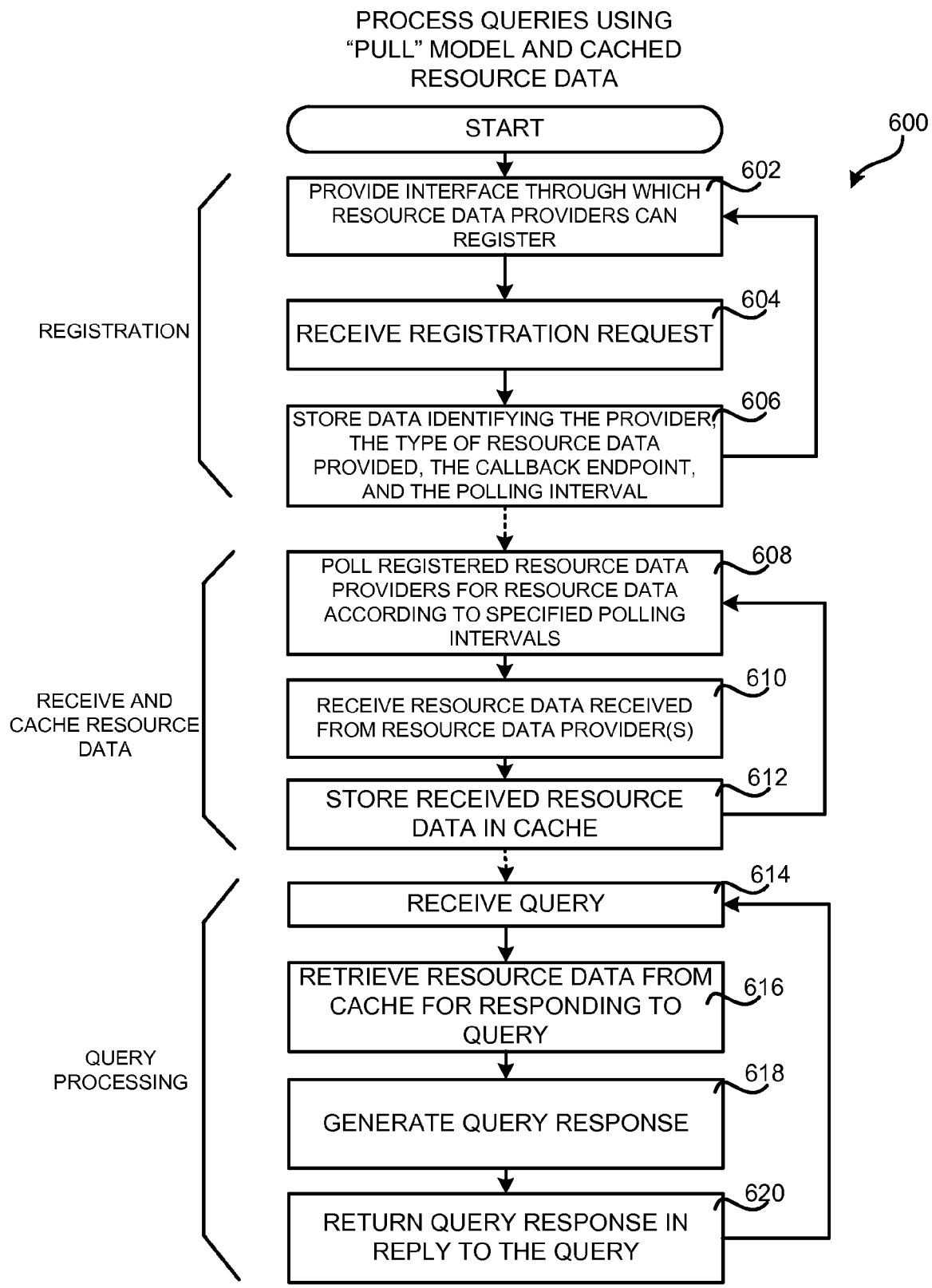
FIG. 6 is a flow diagram showing one illustrative routine for processing queries for resource data describing resources in a distributed execution environment that utilizes a "pull" model for obtaining the resource data and a cache for storing the resource data, according to one embodiment disclosed herein.

FIG. 6 is a flow diagram showing one illustrative routine 600 for processing queries for resource data 112 describing resources in a distributed execution environment 102 that utilizes the "pull" model shown in FIG. 5 for obtaining the resource data 112 in conjunction with a cache 302 for storing the resource data 112, according to one embodiment disclosed herein. The routine 600 begins at operation 602, where the query service 106 provides one or more interfaces through which the resource data providers 108 can register as providers of certain types of resource data 112. As discussed above, the registration interface, or interfaces, provided by the query service 106 may be a Web service API or another type of interface. Other mechanisms might also be implemented for allowing the resource data providers 108 to register as providers of resource data 112.

From operation 602, the routine 600 proceeds to operation 604, where the query service 106 receives a registration request 114 from a resource data provider 108. As mentioned above, the registration request 114 might identify the resource data provider 108 submitting the registration request and the type of resource data 112 provided by the resource data provider 108. As discussed above, the registration request 114 might also specify a callback endpoint 116 and a polling interval 502 in some implementations. Other types of information might also be specified in a registration request 114.

From operation 604, the routine 600 proceeds to operation 606, where the query service 106 stores the data received in the registration request 114. For example, the query service 106 might store data identifying the resource data provider 108, the type of resource data 112 provided by the resource data provider 108, the specified callback endpoint 116, the polling interval 502, and potentially other information in an appropriate data store. As will be described in detail below, this information may be utilized to poll resource data providers 108 for resource data 112. From operation 606, the routine 600 may proceed back to operation 602, where additional resource data providers 108 may be registered with the query service 106 in the manner described above.

Once at least one resource data provider 108 has been registered, the routine 600 may proceed from operation 606 to operation 608. At operation 608, the query service 106 polls the registered resource data providers 108 for resource data 112 using the specified callback endpoints 116 and polling intervals 502. The routine 600 then proceeds from operation 608 to operation 610, where the query service 106 receives resource data 112 in response to the polling requests 120. The received resource data 112 is then stored in the cache 302 at operation 612 for use in processing queries 118. The routine 600 may then proceed from operation 612 back to operation 608, where additional polling of the resource data providers 108 may occur.

From operation 612, the routine 600 proceeds to operation 614, where the query service 106 receives a query 118, such as from the resource state viewing tool 109 for example. In response to the receipt of a query 118, the routine 600 proceeds from operation 614 to operation 616, where the query service 106 retrieves resource data 112 from the cache 302 for responding to the query 118. The routine 600 then proceeds to operation 618, where the query service 106 utilizes the resource data 112 retrieved from the cache 302 to generate a query response 122. As described above, the query service 106 may perform one or more logical, arithmetic, statistical, and/or other types of operations on the resource data 112 retrieved from the cache 302 in order to generate a query response 122.

Once the query response 122 has been generated, the routine 600 proceeds from operation 618 to operation 620, where the query service 106 provides the generated query response 122 in reply to the query 118 for the resource data 112. For example, a query response 122 may be provided to the resource state viewing tool 109 in reply to a query 118. The routine 600 may then proceed back to operation 614, described above, where the query service 106 may process additional queries 118 in a similar manner.

As discussed briefly above, various combinations of the push and pull mechanisms described herein might be utilized in some embodiments. For example, and without limitation, a push model for obtaining resource data 112 such as that described above with regard to FIGS. 3 and 4 might be utilized with one or more resource data providers 108 while a pull model such as that described above with regards to FIGS. 1, 2, 5 and 6, is utilized with other resource data providers 108.

In some embodiments, a push or a pull model for obtaining the resource data 112 is selected and utilized for each resource data provider 108 depending upon various factors. For example, and without limitation, the type of model utilized by the query service 106 to obtain resource data 112 from each of the resource data providers 108 might be selected based upon the amount of resource data 112 to be obtained, the desired or required freshness of the resource data 112, the frequency of additions or updates to the resource data 112, the latency and/or other performance characteristics of each resource data provider 108, the ability of the resource data providers 108 to handle frequent requests 120, user requirements, and/or other factors or considerations. The particular model utilized to obtain resource data 112 from each of the resource data providers 108 might also be selected dynamically and periodically modified based upon changing considerations.

The query service 106 and the resource data providers 108 might also engage in a negotiation by which a push or pull model for providing the resource data 108 to the query service 106 is selected. Alternately, the query service 106 might instruct a resource data provider 108 which model to utilize. A resource data provider 108 might similarly instruct the query service 106 as to which model it will utilize.

For example, and without limitation, a resource data provider 108 might transmit a message to the query service 106 indicating that it will be unavailable for a period of time and that the query service 106 should utilize cached resource data 112 while the resource data provider 108 is down. When the resource data provider 108 returns online, it might instruct the query service 106 to return to using a pull model for obtaining the resource data 112. Similarly, the query service 106 might transmit a message to a resource data provider 108 indicating that requests 120 are not being processed quickly enough and that the query service 106 should switch to one of the caching models described above. Other types of negotiations might also be performed between the query service 106 and the resource data providers 108 in order to select a particular model for provision of the resource data 112 that is appropriate based upon current circumstances.

The query service 106 might also utilize various mechanisms to determine which resource data provider 108 to utilize as the authoritative source for a certain type of resource data 112 when two or more resource data providers 108 have registered as providers of the same type of resource data 112. For example, and without limitation, the query service 106 might only permit one resource data provider 108 to be registered at a time as the primary source for certain types of resource data 112. The query service 106 might also allow one or more backup resource data providers 108 to also register for use in the event that the primary resource data provider 108 is unavailable. In some embodiments, the query service 106 will permit only one resource data provider 108 to be registered for each type of resource data 112.

In other implementations, the query service 106 might query multiple resource data providers 108 for the same type of resource data 112. The query service 106 might then perform various operations to determine which of the responses to utilize in the processing of a query 118. For example, and without limitation, the query service 106 might select resource data 112 based upon the staleness of the data, service level agreements ("SLAs") or other considerations. The query service 106 might also select resource data 112 to use in processing a query 118 by determining if there is consensus among resource data 112 returned from multiple resource data providers 108.

The query service 106 might also average or perform other arithmetic and/or statistic operations on resource data 112 received from multiple resource data providers 112. The resulting value may then be utilized to generate a query response 122. This might be useful, for instance, when the resource data 112 is expressed as numerical values (e.g. the internal temperature of a server computer) that are sensed and reported by multiple sources (e.g. multiple temperature sensing devices). Other types of operations might also be performed on resource data 112 received from multiple resource data providers 108 in other implementations.

It should be appreciated that, in some embodiments, different resource providers 108 might utilize unique data formats to express the resource data 112. In these embodiments, various mechanisms might be utilized to make the resource data 112 accessible to the query service 106 for performing queries 118. For example, and without limitation, a resource data providers 108 might convert its unique data format to a common data format utilized by the query service 106. In other embodiments, the resource data providers 108 might provide resource data 112 in a unique format along with a schema that describes the particular format utilized by a resource data provider 108. In this example, the query service 106 might utilize the schema for a given resource data provider 108 and utilize the specified schema when performing queries 118 in the manner described herein. Other mechanisms might also be utilized to perform the queries 118 on resource data 112 expressed using different data formats.

Figure 7:
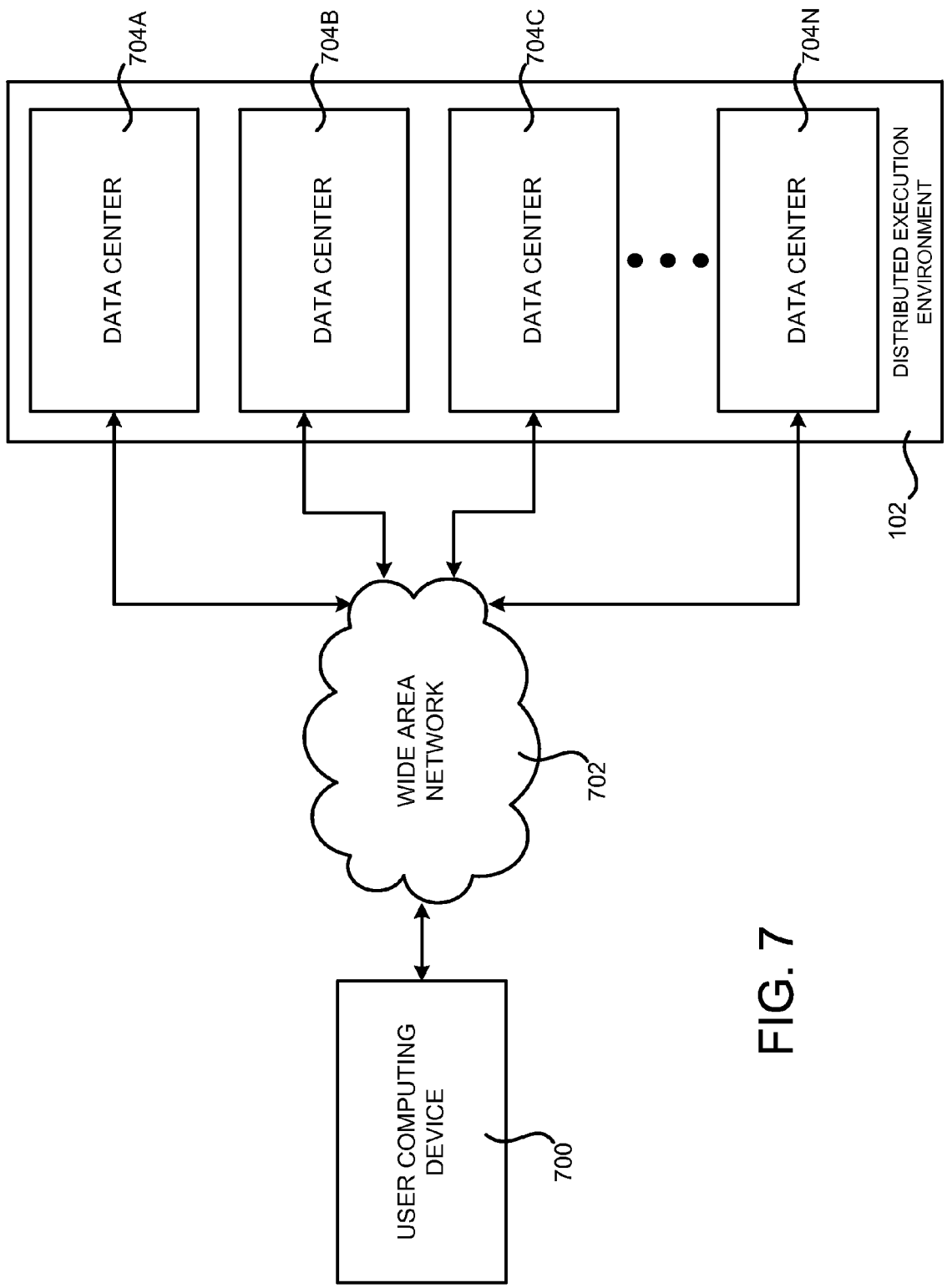
FIG. 7 is a system and network diagram that shows one illustrative operating environment for the embodiments disclosed herein that includes a distributed execution environment.

FIG. 7 and the following description are intended to provide a brief, general description of a suitable computing environment in which the embodiments described herein may be implemented. In particular, FIG. 7 is a system and network diagram that shows an illustrative operating environment that includes a distributed execution environment 102. As discussed above, the distributed execution environment 102 can provide computing resources on a permanent or an as-needed basis.

The computing resources provided by the distributed execution environment 102 may include various types of resources, such as data processing resources, data storage resources, networking resources, data communication resources, and the like. Each type of computing resource may be general-purpose or may be available in a number of specific configurations. For example, and as discussed briefly above, data processing resources may be available as virtual machine instances in a number of different configurations. The virtual machine instances may be configured to execute applications, including Web servers, application servers, media servers, database servers, and other types of applications. Data storage resources may include file storage devices, block storage devices, and the like. Each type or configuration of a computing resource may be available in different sizes, such as large resources, consisting of many processors, large amounts of memory, and/or large storage capacity, and small resources consisting of fewer processors, smaller amounts of memory, and/or smaller storage capacity.

As also mentioned above, the computing resources provided by the distributed execution environment 102 are enabled in one implementation by one or more data centers 704A-704N (which may be referred to herein singularly as "a data center 704" or collectively as "the data centers 704"). The data centers 704 are facilities utilized to house and operate computer systems and associated components. The data centers 704 typically include redundant and backup power, communications, cooling, and security systems. The data centers 704 might also be located in geographically disparate locations. One illustrative configuration for a data center 704 that may be utilized to implement the concepts and technologies disclosed herein will be described below with regard to FIG. 8.

Users of the distributed execution environment 102 may access the computing resources provided by the data centers 704 over a suitable data communications network, such as a Wide Area Network ("WAN") 702. Although a WAN 702 is illustrated in FIG. 7, it should be appreciated that a local-area network ("LAN"), the Internet, or any other networking topology known in the art that connects the data centers 704 to user computing devices may be utilized. It should also be appreciated that combinations of such networks might also be utilized.

Figure 8:
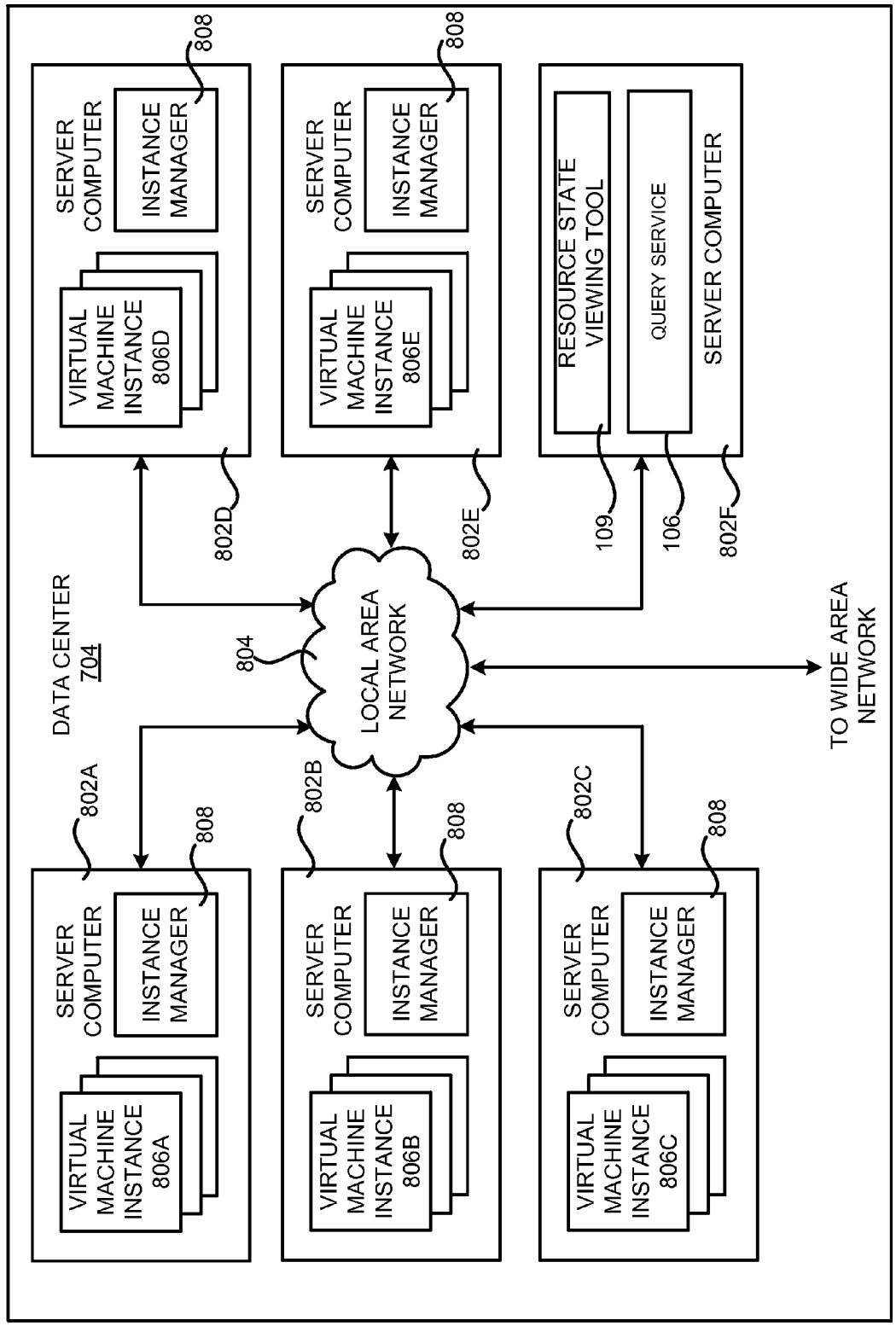
FIG. 8 is a computing system diagram that illustrates one configuration for a data center that implements aspects of the concepts and technologies disclosed herein for processing queries for resource data describing resources in a distributed execution environment, according to one embodiment disclosed herein.

FIG. 8 is a computing system diagram that illustrates one configuration for a data center 704 that implements a distributed execution environment 102, including the concepts and technologies disclosed herein. The example data center 704 shown in FIG. 8 includes several server computers 802A-802F (which may be referred to herein singularly as "a server computer 802" or in the plural as "the server computers 802"). As mentioned briefly above, the server computers 802 may be standard tower or rack-mount server computers configured appropriately for providing the computing resources described herein. For example, in one implementation the server computers 802 are configured to provide the virtual machine instances 806A-806E.

As known in the art, a virtual machine instance is an instance of a software implementation of a machine (i.e. a computer) that executes programs like a physical machine. Each of the servers 802 may be configured to execute an instance manager 808 capable of instantiating and managing the virtual machine instances 806. The instance manager 808 might be a hypervisor or another type of program configured to enable the execution of multiple virtual machine instances 806 on a single server 802, for example.

It should be appreciated that although the embodiments disclosed herein are described primarily in the context of virtual machine instances 806, other types of computing resources can be utilized with the concepts and technologies disclosed herein. For example, the technologies disclosed herein might be utilized with hardware resources, data storage resources, data communications resources, networking resources, database resources, and with other types of computing resources.

The data center 704 shown in FIG. 8 also includes a server computer 802F reserved for executing software components for managing the operation of the data center 704, the server computers 802, the virtual machine instances 104A, and other computing resources within the distributed execution environment 102. In particular, the server computer 802F might execute the resource state viewing tool 109 and the query service 106. Details regarding the operation of each of these components have been provided above. In this regard, it should be appreciated that while these components are illustrated as executing within the distributed execution environment 102, computing systems that are external to the distributed execution environment 102 might also be utilized to execute some or all of these components. Other configurations might also be utilized.

In the example data center 704 shown in FIG. 8, an appropriate local area network ("LAN") 804 is utilized to interconnect the server computers 802A-802E and the server computer 802F. The LAN 804 is also connected to the WAN 702 illustrated in FIG. 7. It should be appreciated that the configuration and network topology illustrated in FIGS. 7 and 8 has been greatly simplified and that many more computing systems, networks, and networking devices may be utilized to interconnect the various computing systems disclosed herein. Appropriate load balancing devices or software modules might also be utilized for balancing a load between each of the data centers 704A-704N, between each of the server computers 802A-802F in each data center 704, and between virtual machine instances 806 provided by the server computers 802A-802F.

It should be appreciated that the data center 704 described in FIG. 8 is merely illustrative and that other implementations might be utilized. In particular, functionality described herein as being performed by the resource state viewing tool 109 and the query service 106 might be performed by one another, might be performed by other components, or might be performed by a combination of these or other components. Additionally, it should be appreciated that the functionality provided by these components might be implemented in software, hardware, or a combination of software and hardware. Other implementations should be apparent to those skilled in the art.

Figure 9:
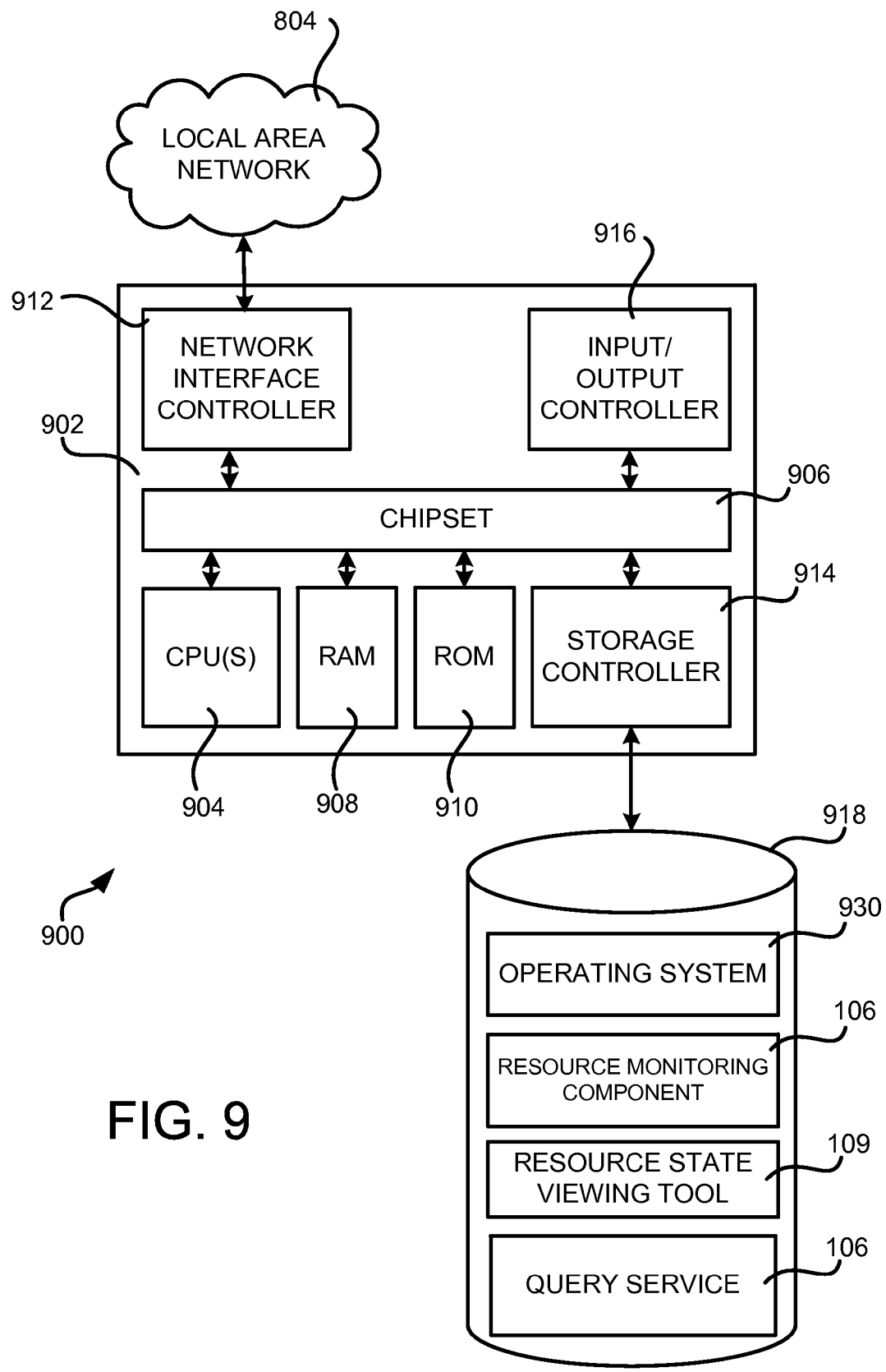
FIG. 9 is a computer architecture diagram showing one illustrative computer hardware architecture for implementing a computing device that might be utilized to implement aspects of the various embodiments presented herein.

FIG. 9 shows an example computer architecture for a computer 900 capable of executing the program components described above. The computer architecture shown in FIG. 9 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein described as executing on user computing devices, within the data centers 704A-704N, on the server computers 802A-802F, or on any other computing system mentioned herein.

The computer 900 includes a baseboard 902, or "motherboard," which is a printed circuit board to which a multitude of components or devices may be connected by way of a system bus or other electrical communication paths. In one illustrative embodiment, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a random access memory ("RAM") 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the embodiments described herein.

The computer 900 may operate in a networked environment using logical connections to remote computing devices and computer systems through a network, such as the local area network 804. The chipset 906 may include functionality for providing network connectivity through a NIC 912, such as a gigabit Ethernet adapter. The NIC 912 is capable of connecting the computer 900 to other computing devices over the network 804. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules, and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage, and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer 900. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 918 may store other system or application programs and data utilized by the computer 900, the resource state viewing tool 109, the query service 106, and/or any of the other software components and data described above. The mass storage device 918 might also store other programs and data not specifically identified herein.

In one embodiment, the mass storage device 918 or other computer-readable storage media is encoded with computer-executable instructions which, when loaded into the computer 900, transforms the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various routines described above with regard to FIGS. 2, 4 and 6.

The computer 900 may also include one or more input/output controllers 916 for receiving and processing input from a number of input devices, such as a keyboard, a mouse, a touchpad, a touch screen, an electronic stylus, or other type of input device. The input/output controllers 916 might also receive input from a digital camera and/or video camera, a GPS sensor, a compass, a gyroscope, or another type of sensor utilized to determine the location and/or the orientation of the computer 900. The input/output controller 916 might also be connected to one or more wireless radios for facilitating wireless communication with the computer 900.

The input/output controller 916 might also provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9. For example, the computer 900 might be implemented utilizing system on a chip ("SOC") technologies and other types of technologies suitable for use in implementing smartphones, tablet computing devices, and other types of mobile computing devices.

Based on the foregoing, it should be appreciated that technologies for processing queries for data describing resources in a distributed execution environment have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method of processing a query for resource data describing resources in a distributed execution environment, the method comprising performing computer-implemented operations for:
   receiving, at a query service executing on one or more computing devices, a registration request from one or more resource data providers specifying that the one or more resource data providers are providers of resource data that describes resources in the distributed execution environment, the registration request further specifying a callback endpoint;
   periodically polling, by the query service, the one or more resource data providers for resource data by transmitting a request for the resource data to the callback endpoint specified in the registration request;
   receiving resource data from the one or more resource data providers;
   storing, by the query service, the resource data received from the one or more registered resource data providers in a cache;
   receiving, at the query service, a query for resource data; and
   in response to receiving the query,
   utilizing, at the query service, the resource data stored in the cache to generate a response to the query, and
   providing, by the query service, the response in reply to the query for the resource data.

2. The computer-implemented method of claim 1, wherein utilizing the received resource data to generate a response to the query comprises performing one or more operations on resource data received from one or more resource data providers to generate the response to the query.

3. The computer-implemented method of claim 1, wherein the registration request further specifies a type of the resource data for which the one or more resource data providers is a provider.

4. The computer-implemented method of claim 1, wherein the resources in the distributed execution environment comprise one or more virtual machine instances.

5. The computer-implemented method of claim 1, further comprising receiving data identifying a polling interval from the one or more resource data providers, wherein the polling interval is utilized to determine a time at which to poll the one or more resource data providers for the resource data.

6. The computer-implemented method of claim 1, wherein the request for the resource data transmitted to the one or more resource data providers comprises a timestamp indicating a time at which a last request for resource data was made.

7. The computer-implemented method of claim 1, wherein the resource data received from the one or more resource data providers comprises resource data updated since the time at which the last request for the resource data was made.

8. The computer-implemented method of claim 1, wherein the cache comprises an in-memory cache and wherein the in-memory cache is configured to store pointers to unique values of the resource data.

9. A system for processing a query for resource data, the system comprising
   one or more computing devices having a query service executed thereupon, the query service being configured to:
   receive a registration request from one or more resource data providers specifying that the one or more resource data providers are providers of resource data that describes one or more of an operational status, a location or a configuration of computing resources in a distributed execution environment, the registration request further specifying a callback endpoint;
   periodically poll the one or more resource data providers for resource data by transmitting a request for the resource data to the callback endpoint specified in the registration request;
   receive resource data from the one or more resource data providers;
   store the resource data received from the one or more registered resource data providers in a cache;
   receive a query for resource data;
   in response to receiving the query, utilize the resource data stored in the cache to generate a response to the query; and
   provide the response in reply to the query for the resource data.

10. The system of claim 9, wherein utilizing the received resource data stored in the cache to generate a response to the query comprises performing one or more operations on the resource data stored in the cache to generate the response to the query.

11. The system of claim 9, wherein the query service is further configured to receive data identifying a polling interval from the one or more resource data providers, and wherein the polling interval is utilized to determine a time at which to poll the one or more registered resource data providers for the resource data.

12. The system of claim 9, wherein the request for the resource data transmitted to the one or more resource data providers comprises a timestamp indicating a time at which a last request for resource data was made.

13. The system of claim 12, wherein the resource data received from the one or more resource data providers comprises resource data updated since the time at which the last request for the resource data was made.

14. The system of claim 9, wherein the cache comprises an in-memory cache and wherein the in-memory cache is configured to store pointers to unique values of the resource data.

15. The system of claim 9, wherein the computing resources comprise one or more virtual machine instances.

16. An apparatus comprising:
a processor; and
a computer storage medium having computer executable instructions stored thereon which, when executed by the processor, cause the apparatus to
receive a registration request from one or more resource data providers specifying that the one or more resource data providers are providers of resource data that describes resources in the distributed execution environment, the registration request further specifying a callback endpoint,
periodically poll the one or more resource data providers for resource data by transmitting a request for the resource data to the callback endpoint specified in the registration request,
receive resource data from the one or more resource data providers,
store the resource data received from the one or more resource data providers in a cache,
receive a query for resource data,
in response to receiving the query, utilize the resource data stored in the cache to generate a response to the query, and
provide the response in reply to the query for the resource data.

17. The apparatus of claim 16, wherein the computer storage medium having further computer executable instructions which, when executed by the processor, cause the apparatus to receive data identifying a polling interval from the one or more resource data providers, the polling interval being utilized to determine a time at which to poll the one or more resource data providers for the resource data.

18. The apparatus of claim 16, wherein the resource data received from the one or more resource data providers comprises resource data updated since the time at which the last request for the resource data was made.

19. The apparatus of claim 16, wherein utilizing the received resource data to generate a response to the query comprises performing one or more operations on resource data received from one or more resource data providers to generate the response to the query.

20. The apparatus of claim 16, wherein the cache comprises an in-memory cache and wherein the in-memory cache is configured to store pointers to unique values of the resource data.

* * * * *